United States Patent
Aiello et al.

(10) Patent No.: US 8,878,395 B2
(45) Date of Patent: Nov. 4, 2014

(54) M2LC SYSTEM COUPLED TO A CURRENT SOURCE POWER SUPPLY

(75) Inventors: Marc Francis Aiello, Oakmont, PA (US); Dustin Matthew Kramer, Fort Collins, CO (US); Kenneth Stephen Berton, Greensburg, PA (US)

(73) Assignee: Unico, Inc., Franksville, WI (US)

( * ) Notice: Subject to any disclaimer, the term of this patent is extended or adjusted under 35 U.S.C. 154(b) by 527 days.

(21) Appl. No.: 13/196,922

(22) Filed: Aug. 3, 2011

(65) Prior Publication Data

US 2012/0032512 A1 Feb. 9, 2012

Related U.S. Application Data (60) Provisional application No. 61/370,515, filed on Aug. 4, 2010.

(51) Int. Cl.
*H01F 27/42* (2006.01)
*H02M 7/49* (2007.01)
*H02M 1/00* (2006.01)
*H02M 7/483* (2007.01)

(52) U.S. Cl.
CPC ........ *H02M 7/49* (2013.01); *H02M 2001/0006* (2013.01); *H02M 2001/0087* (2013.01); *H02M 2001/009* (2013.01); *H02M 2007/4835* (2013.01)
USPC ........................................ 307/104

(58) Field of Classification Search
USPC .................................. 307/43, 104
See application file for complete search history.

(56) References Cited

U.S. PATENT DOCUMENTS

| | | | |
|---|---|---|---|
| 5,625,545 | A | 4/1997 | Hammond |
| 6,236,580 | B1 | 5/2001 | Aiello et al. |
| 6,545,452 | B2 | 4/2003 | Bruckmann et al. |
| 7,269,037 | B2 | 9/2007 | Marquardt |
| 7,577,008 | B2 | 8/2009 | Hiller |
| 7,835,166 | B2 | 11/2010 | Hiller |
| 7,924,585 | B2 | 4/2011 | Sommer |
| 2008/0198630 | A1 | 8/2008 | Hiller |
| 2008/0205093 | A1 | 8/2008 | Davies et al. |
| 2008/0232145 | A1 | 9/2008 | Hiller et al. |
| 2008/0259661 | A1 | 10/2008 | Hiller et al. |
| 2008/0310205 | A1 | 12/2008 | Hiller |
| 2010/0172119 | A1 | 7/2010 | Aiello et al. |
| 2011/0002149 | A1 | 1/2011 | Hiller et al. |

(Continued)

FOREIGN PATENT DOCUMENTS

DE 10031778 1/2002
WO 2007028349 3/2007

OTHER PUBLICATIONS

Tommy Kjellqvist, "On Design of a Compact Primary Switched Conversion System for Electric Railway Propulsion", 2009, KTH, School of Electrical Engineering (EES), Electrical Machines and Power Electronics, ISBN 978-91-7415-327-9, pp. 1-74.*

(Continued)

*Primary Examiner* — Daniel Cavallari
(74) *Attorney, Agent, or Firm* — Reinhart Boerner Van Deuren s.c.

(57) ABSTRACT

A system. The system is a modular multilevel converter system and includes a plurality of series connected two-terminal modular multilevel converter subsystems. The subsystems are magnetically coupled to an AC current source power supply.

16 Claims, 8 Drawing Sheets

(56) References Cited

U.S. PATENT DOCUMENTS

2011/0018481 A1  1/2011  Hiller
2011/0049994 A1  3/2011  Hiller et al.
2011/0089873 A1  4/2011  Blöcher et al.

OTHER PUBLICATIONS

Search Report and Written Opinion for corresponding International Application No. PCT/US2011/046347 dated Dec. 9, 2011.
Alves, et al., "Medium Voltage Industrial Variable Speed Drives", WEG Automaçš ăo, Brazil, 2009.
Song, et al., "Multilevel Optimal Modulation and Dynamic Control Strategies for STATCOMs Using Cascaded Multilevel Inverters", IEEE Transactions on Power Delivery, vol. 22, No. 3, Jul. 2007, pp. 1937-1946.
Lesnicar, et al., "An Innovative Modular Multilevel Converter Topology Suitable for a Wide Power Range", Power Tech Conference Proceedings, 2003, IEEE Bologna, vol. 3, Jun. 2003, pp. 1-6.
Allebrod, et al., "New Transformerless, Scalable Modular Multilevel Converters for HVDC-Transmission", IEEE; 2008; pp. 174-179.
Glinka, "Prototype of Multiphase Modular-Multilevel-Converter with 2MW power rating and 17-level-output-voltage", Power Electronics Specialist Conference, 2004 IEEE, vol. 4, pp. 2572-2576.
Marquardt, et al., "New Concept for High Voltage—Modular Multilevel Converter PESC 2004 Conference in Aachen, Germany", 2004.
Glinka, et al., "A New AC/AC Multilevel Converter Family", IEEE Transactions on Industrial Electronics, vol. 52, No. 3, Jun. 2005, pp. 662-669.

* cited by examiner

M2LC SYSTEM COUPLED TO A CURRENT SOURCE POWER SUPPLY

CROSS-REFERENCE TO RELATED APPLICATION

This application claims the benefit under 35 U.S.C. §119 (e) of the earlier filing date of U.S. provisional Patent Application No. 61/370,515 filed on Aug. 4, 2010.

BACKGROUND

This application discloses an invention which is related, generally and in various embodiments, to a modular multilevel converter (M2LC) system having a plurality of M2LC subsystems (cells) coupled to a current source power supply. The current source power supply is external to the M2LC subsystems and supplies control power to each M2LC subsystem independent of the energy state of the M2LC subsystem.

Figure 1:
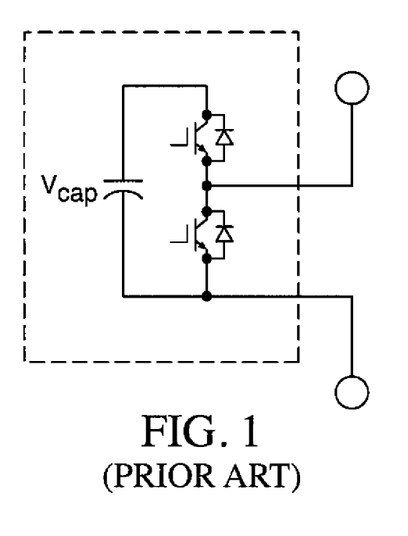
FIG. 1 illustrates a two-level configuration of an M2LC cell having two terminals.
Figure 2:
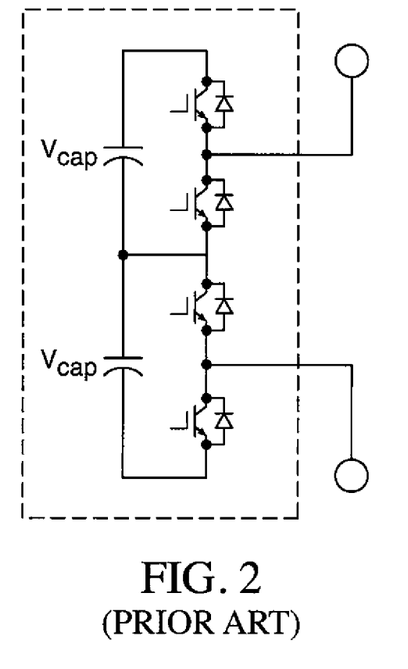
FIG. 2 illustrates a three-level configuration of an M2LC cell having two terminals.

Many papers have been published regarding the Modular Multilevel Converter (M2LC) topology. FIG. 1 illustrates a two-level configuration of an M2LC cell having two terminals, and FIG. 2 illustrates a three-level configuration of an M2LC cell having two terminals.

As shown in FIG. 1, the M2LC cell includes two switching devices, two diodes, a capacitor and two terminals. With the configuration shown in FIG. 1, the two switching devices can be controlled such that one of two different potentials (e.g., zero volts or $V_{cap}$) may be present across the two terminals. As shown in FIG. 2, the M2LC cell includes four switching devices, four diodes, two capacitors and two terminals. With the configuration shown in FIG. 2, the four switching devices can be controlled such that one of three different potentials (e.g., zero volts, $V_{cap}$, or $2V_{cap}$) may be present across the two terminals. Although other topologies of the M2LC cells are possible, all of the topologies may be defined as two-terminal subsystems or cells with internal capacitor energy storage(s) which are capable of producing various levels of voltages between the two terminals depending on the state of the switching devices.

It will be appreciated that the M2LC topology possesses the advantages of the Cascaded H Bridge (CCH) topology in that it is modular and capable of high operational availability due to redundancy. Additionally, the M2LC topology can be applied in common bus configurations with and without the use of a multi-winding transformer. In contrast to M2LC, CCH requires the utilization of a multi-winding transformer which contains individual secondary windings which supply input energy to the cells.

However, unlike CCH, the M2LC cells (or subsystems) are not independently supplied from isolated voltage sources or secondary windings. For a given M2LC cell, the amount of energy output at one of the two terminals depends on the amount of energy input at the other one of the two terminals. This can cause a problem in controlling the DC link voltages in these cells during pre-charge of the power circuit or during abnormal operation when one or more of the cells needs to be bypassed or made inactive.

Since during precharge, the operating voltage on the cell DC links can depend on the proper or improper operation of other cells connected in series, there exists a risk that significant system damage can occur before the cell power supplies can become active and allow the cell to communicate to a higher level controller (e.g., a hub).

Also, since the M2LC topology uses twice as many IGBT switches as its CCH counterpart, the M2LC topology is best suited to cell operating voltages which may be two or even four times the comparable CCH design to normalize or limit the power switch count. These higher bus voltages present a challenge to the design of the switch mode power supply that is usually part of the power cell to supply power to the gate control of the IGBTs and to the cell control circuits.

Furthermore, the M2LC topology allows for the shutdown of cells or portions of cells (in effect bypassing portions of the power topology) in which the cell control or gate control fails to operate correctly. However, because shutting down an M2LC cell causes the ultimate loss of the DC link voltage which supplies the cell power supplies, the shutting down of an M2LC cell causes the loss of cell control power.

Thus, it will be appreciated that utilizing a single power supply in each cell to provide the required cell control and gate control power to the respective M2LC cells is less than optimal under all operating conditions, including fault conditions.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 3:
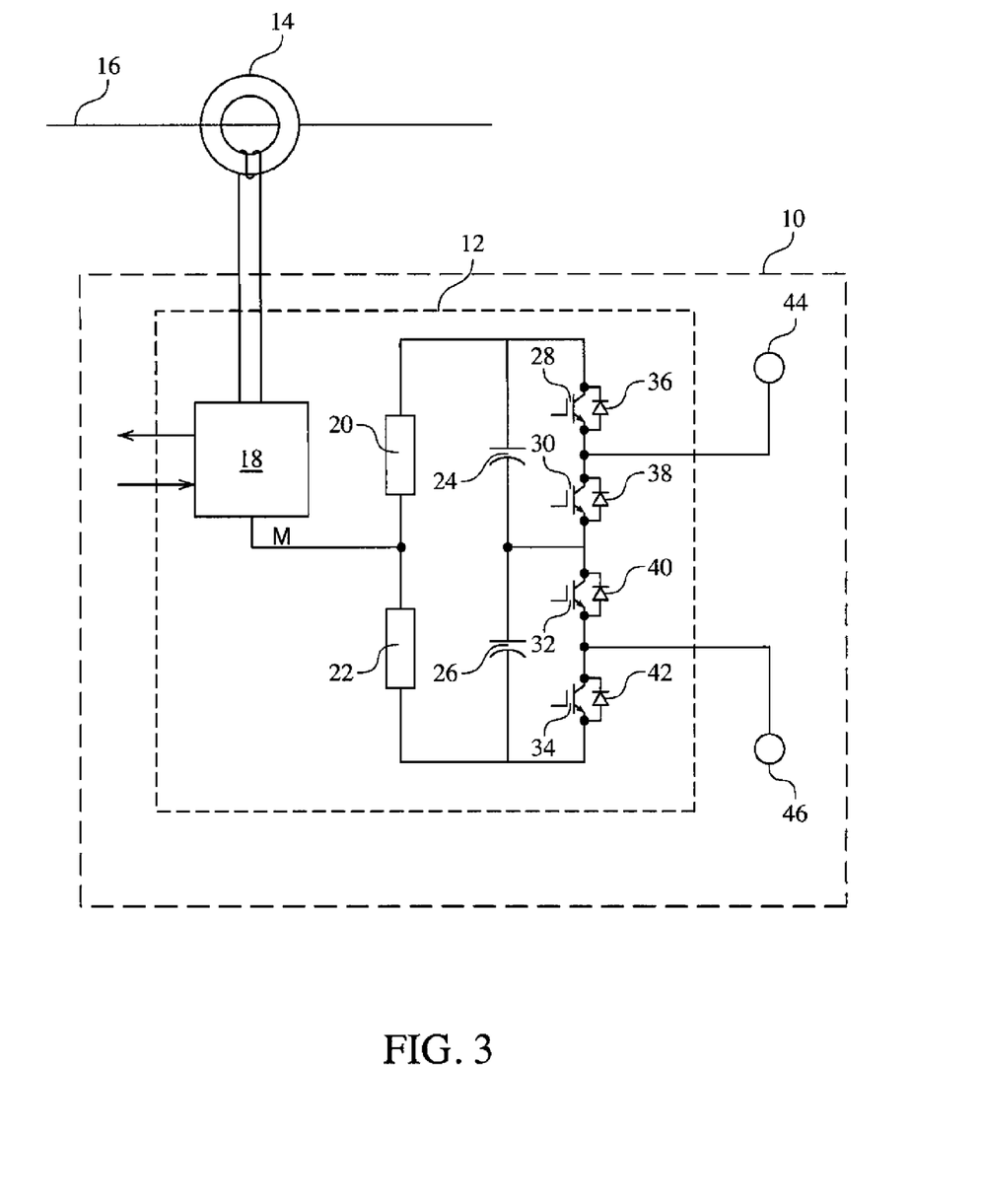
FIG. 3 illustrates various embodiments of a M2LC system.

FIG. 3 illustrates various embodiments of a M2LC system 10. The system 10 includes a plurality of M2LC subsystems 12. For purposes of simplicity, only one M2LC subsystem 12 is shown in FIG. 3. However, it will be appreciated that the M2LC system 10 may include any number of M2LC subsystems 12. Each M2LC subsystem 12 is electrically connected to a secondary winding of a corresponding current transformer 14, and the respective current transformers 14 each include a primary winding which is electrically connected to a current source power supply 16. Thus, it will be appreciated that the plurality of M2LC subsystems 12 are magnetically coupled to a current source power supply 16.

The current transformers 14 are external to the M2LC subsystems 12, supply cell control power to the corresponding M2LC subsystems 12, and may be embodied as any suitable type of current transformers. For purposes of simplicity, only a portion of the current source power supply 16 is shown in FIG. 3. However, it will be appreciated that the current source power supply 16 may be embodied as any suitable configuration of a current source power supply.

A given M2LC subsystem 12 may be embodied as any suitable configuration of a M2LC cell. For example, as shown in FIG. 3, a given M2LC subsystem 12 may be embodied as a three-level configuration of an M2LC cell. For such embodiments, the M2LC subsystem 12 includes a controller 18, a first resistor 20, a second resistor 22, a first capacitor 24, a second capacitor 26, a first switching device 28, a second switching device 30, a third switching device 32, a fourth switching device 34, a first diode 36, a second diode 38, a third diode 40, a fourth diode 42, a first terminal 44 and a second terminal 46. The switching devices 28-34 may be embodied as any suitable type of switching device. For example, as shown in FIG. 3, the switching devices 28-34 may be embodied as insulated gate bipolar transistors (IGBTs).

As shown in FIG. 3, the controller 18 is electrically connected to the corresponding current transformer 14. According to various embodiments, the current transformer 14 supplies power to the controller 18, and the controller 18 supplies power to the respective gate terminals of the switching devices 28-34. For purposes of simplicity, the connections between the controller 12 and the gate terminals of the respective switching devices 28-34 are not shown in FIG. 3. It will appreciated that for a given M2LC subsystem 10, the power supplied to the given M2LC subsystem 12 may thus be supplied via only a single corresponding current transformer 14. The controller 18 is also generally communicably connected to a higher level controller (e.g., a hub controller) via, for example, two optical fibers. For purposes of simplicity, the higher level controller is not shown in FIG. 3.

For the embodiments shown in FIG. 3, the first and second resistors 20, 22 are electrically connected to the controller 18 and to each other. According to various embodiments, the first and second resistors 20, 22 form a common potential which is electrically connected to a terminal (e.g., a reference-potential terminal) of the controller 18, and the controller 18 utilizes the common potential as a reference-potential to assist in the control of the gates of the respective switching devices 28-34. The first resistor 20 may be embodied as a single resistor or a bank of resistors. Similarly, the second resistor 22 may be embodied as a single resistor or a bank of resistors. In general, the resistances of the first and second resistors 20, 22 have substantially the same value. However, according to other embodiments, the resistances of the first and second resistors 20, 22 may have different values.

The first capacitor 24 is electrically connected the first resistor 20, and the second capacitor 26 is electrically connected to the second resistor 22. According to various embodiments, a first terminal of the first capacitor 24 is electrically connected to the first resistor 20, a first terminal of the second capacitor 26 is electrically connected to the second resistor 22, and a second terminal of the first capacitor 24 and a second terminal of the second capacitor 26 are electrically connected to one another. The first capacitor 24 may be embodied as a single capacitor or a bank of capacitors. Similarly, the second capacitor 26 may be embodied as a single capacitor or a bank of capacitors. In general, the capacitances of the first and second capacitors 24, 26 are substantially the same.

For purposes of simplicity, the M2LC subsystem 12 will hereinafter be described for embodiments where the switching devices 28-34 are IGBTs. The first IGBT 28 is electrically connected to the first capacitor 24 and to the first resistor 20. According to various embodiments, a collector of the first IGBT 28 is electrically connected to the first terminal of the first capacitor 24 and to the first resistor 20. The second IGBT 30 is electrically connected to the first IGBT 28, and to the first and second capacitors 24, 26. According to various embodiments, a collector of the second IGBT 30 is electrically connected to an emitter of the first IGBT 28, and an emitter of the second IGBT 30 is electrically connected to the second terminal of the first capacitor 26 and to the second terminal of the second capacitor 26.

The third IGBT 32 is electrically connected to the second IGBT 30, and to the first and second capacitors 18, 20. According to various embodiments, a collector of the third IGBT 32 is electrically connected to the emitter of the second IGBT 30, to the second terminal of the first capacitor 24, and to the second terminal of the second capacitor 26. The fourth IGBT 34 is electrically connected to the third IGBT 32, to the second capacitor 26, and to the second resistor 22. According to various embodiments, a collector of the fourth IGBT 34 is connected to the emitter of the third IGBT 32, and an emitter of the fourth IGBT 34 is connected to the first terminal the second capacitor 26 and to the second resistor 22.

The first diode 36 is electrically connected to the first IGBT 28. According to various embodiments, a cathode of the first diode 36 is electrically connected to the collector of the first IGBT 28 and an anode of the first diode 36 is electrically connected to the emitter of the first IGBT 28. The second diode 38 is electrically connected to the second IGBT 30. According to various embodiments, a cathode of the second diode 38 is connected to the collector of the second IGBT 30 and an anode of the second diode 38 is connected to the emitter of the second IGBT 30. The third diode 40 is connected to the third IGBT 32. According to various embodiments, a cathode of the third diode 40 is connected to the collector of the third IGBT 32 and an anode of the third diode 40 is connected to the emitter of the third IGBT 32. The fourth diode 42 is connected to the fourth IGBT 34. According to various embodiments, a cathode of the fourth diode 42 is connected to the collector of the fourth IGBT 34 and an anode of the fourth diode 42 is connected to the emitter of the fourth IGBT 34.

The first terminal 44 is connected to the first and second IGBTs 28, 30. According to various embodiments, the first terminal 44 is connected to the emitter of the first IGBT 28 and to the collector of the second IGBT 30. The second terminal 46 is connected to the third and fourth IGBTs 32, 34. According to various embodiments, the second terminal 46 is connected to the emitter of the third IGBT 32 and to the collector of the fourth IGBT 34.

In operation, a given M2LC subsystem 12 is able to generate three different voltage levels (0 volts, $V_{cap}$, and $2V_{cap}$) across the first and second terminals 44, 46 by controlling the gate voltages of the various IGBTs. When a given M2LC subsystem 12 is utilized as a component of a larger system (e.g., M2LC system 10), the gates of the IGBTs may be controlled in a manner to bring the voltages across the first and second capacitors 24, 26 up to 100% (e.g., full line voltage) before voltage is applied to a DC link associated with the larger system. It will be appreciated that the 100% level may be, for example, 1000 volts, 2000 volts, 3000 volts, etc.

Figure 4:
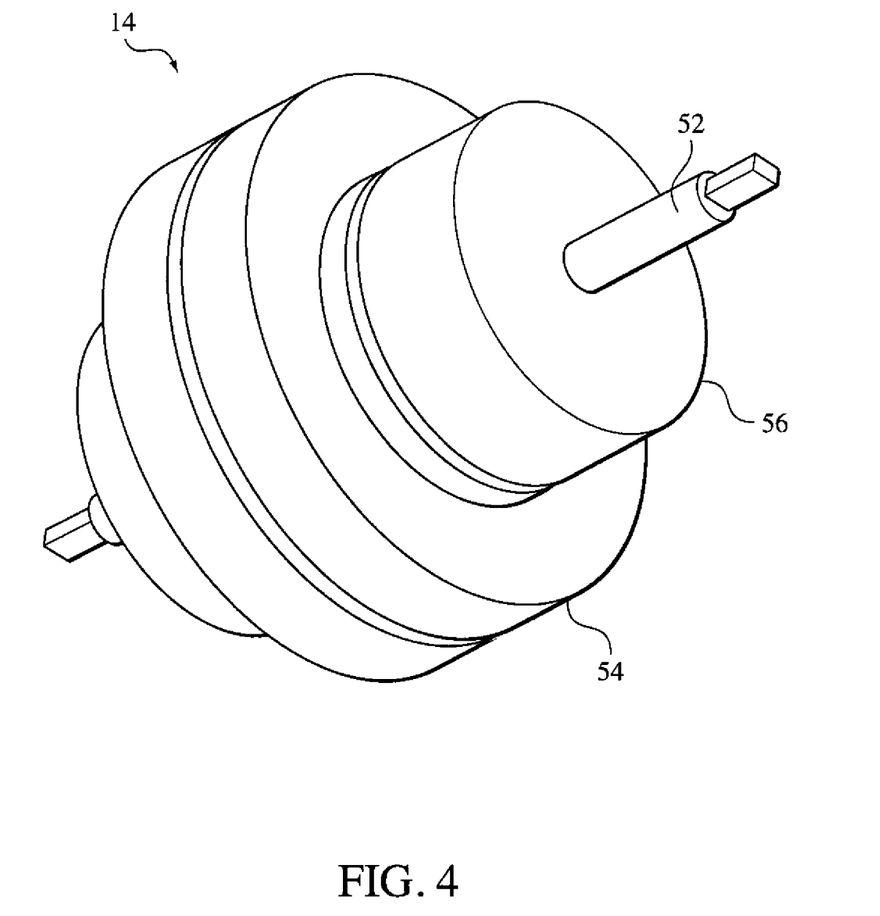
FIG. 4 illustrates various embodiments of a current transformer shown in FIG. 3.

FIG. 4 illustrates various embodiments of the current transformer 14 shown in FIG. 3. The current transformer 14 is a high voltage current transformer which includes a center conductor 52, a core 54 with secondary windings, and an isolation member 56 between the center conductor 52 and the core 54. The center conductor 52 is configured for connection to current source power supply 16, and operates as a single turn primary winding. The core 54 may be fabricated from any suitable material and may be of any suitable configuration. For example, according to various embodiments, the core 54 is fabricated from ferrite and is in the shape of a toroid. The isolation member 56 may be fabricated from any suitable material. For example, according to various embodiments, the isolation member 56 is fabricated from a polyester. The isolation member 56 provides sufficient isolation between a high voltage associated with the core 54 relative to the center conductor 52. Thus, it will be appreciated that each current transformer 14 provides high voltage isolation between the corresponding M2LC subsystem 12 control circuitry and the current source power supply 16.

Figure 5:
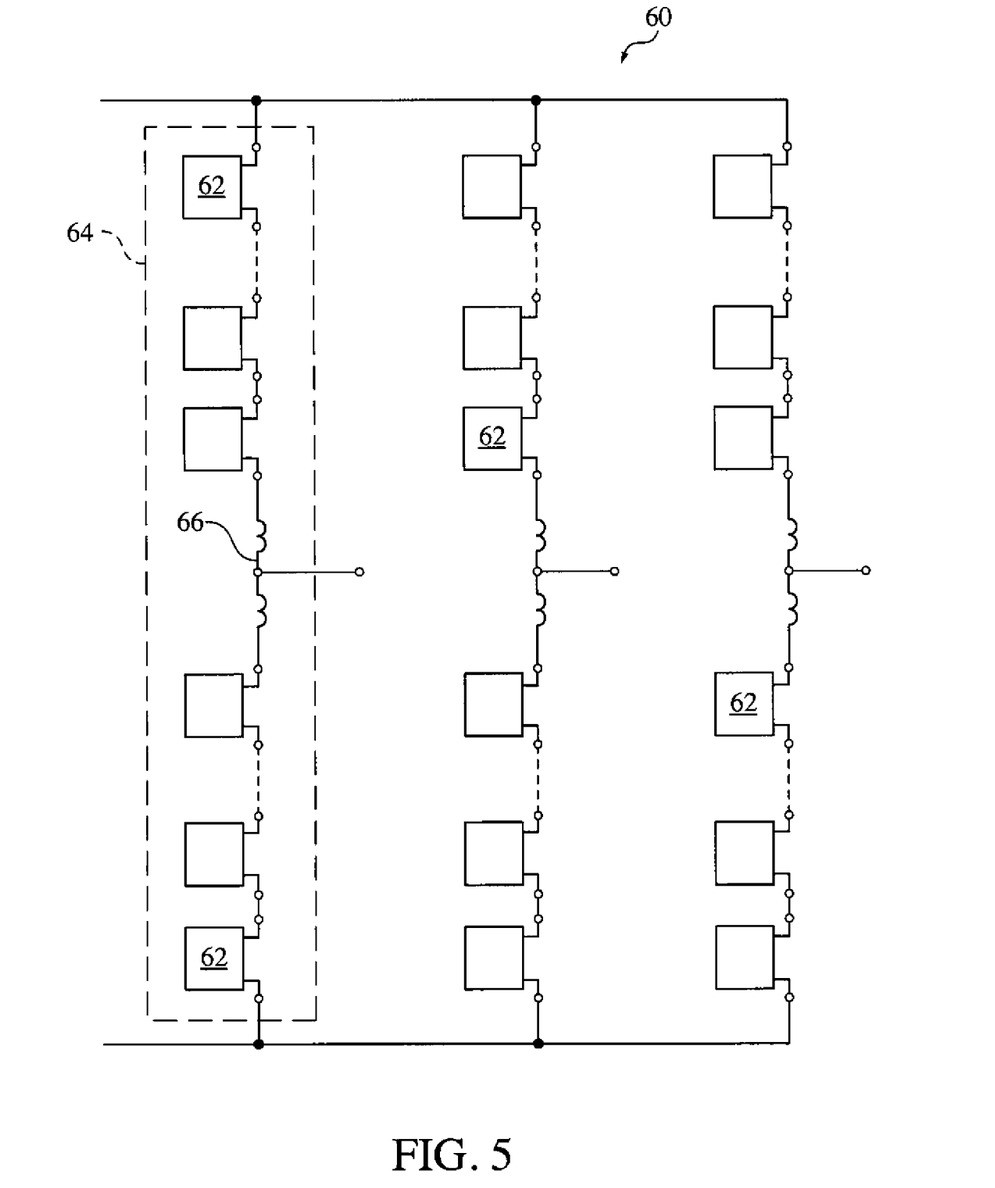
FIG. 5 illustrates various embodiments of another M2LC system.

FIG. 5 illustrates various embodiments of another M2LC system 60. As shown in FIG. 5, the M2LC system 60 is configured as a three-phase bridge which includes a plurality of M2LC subsystems 62. The M2LC subsystems 62 may be similar or identical to the M2LC subsystem 12 shown in FIG. 3. For the eighteen M2LC subsystems 62 of the M2LC system 60, it will be appreciated that eighteen corresponding current transformers (e.g., eighteen current transformers similar or identical to transformer 14) would be utilized to provide control power to the eighteen M2LC subsystems 62. However, for purposes of simplicity, the eighteen corresponding current transformers are not shown in FIG. 5. The M2LC subsystems 62 are arranged as three output phase modules 64. Each output phase module 64 includes a plurality of series-connected M2LC subsystems 62, and each output phase module 64 is further arranged into a positive arm (or valve) and a negative arm (or valve), where each arm (or valve) is separated by an inductive filter 66.

Figure 6:
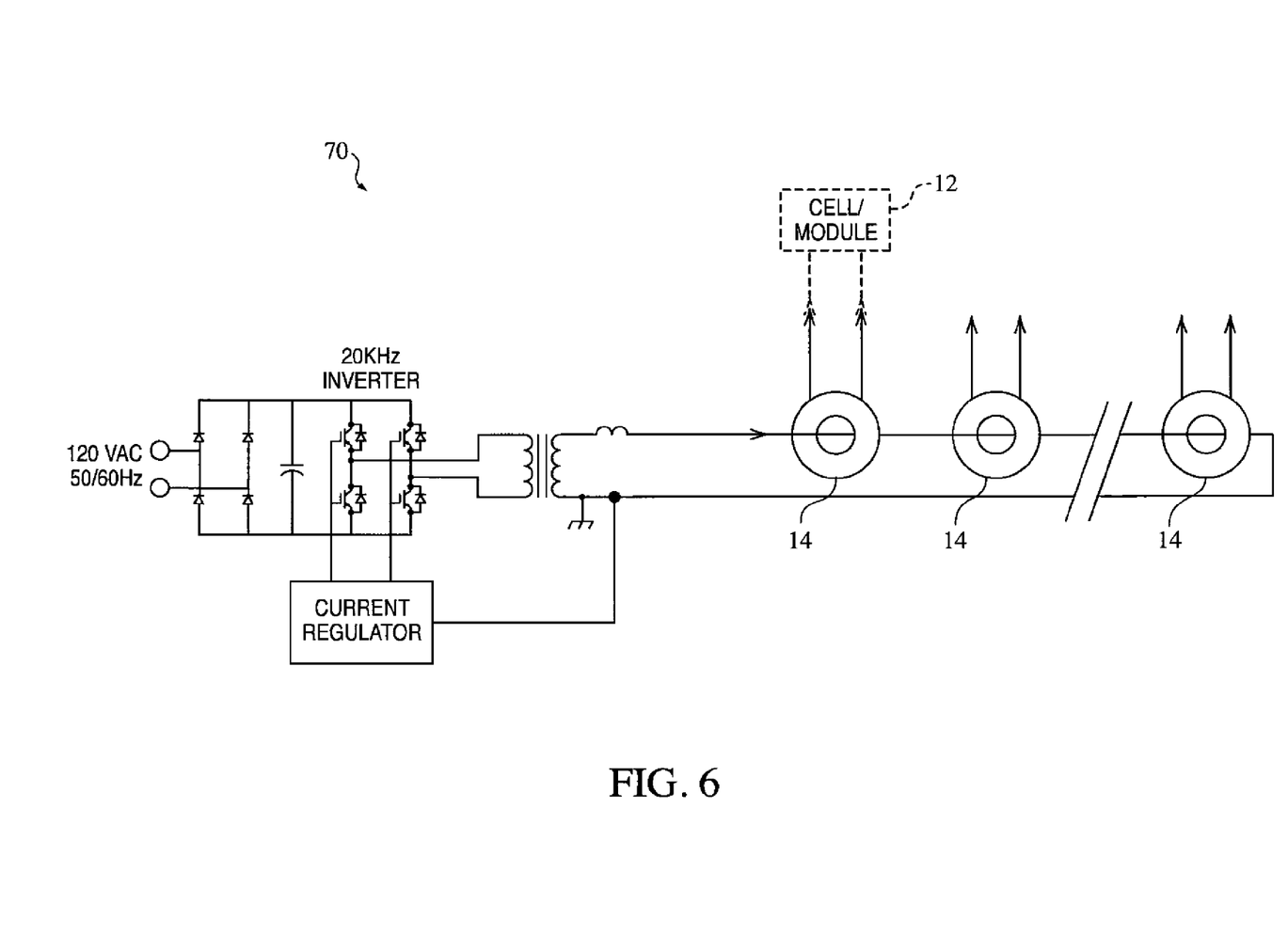
FIG. 6 illustrates a circuit diagram of a controllable AC current source power supply according to various embodiments.

FIG. 6 illustrates a circuit diagram of a controllable AC current source power supply 70 according to various embodiments. The controllable AC current source power supply 70 is a high frequency controllable current source power supply and may be utilized to provide controlled AC current to a plurality of distributed high voltage current transformers (e.g., current transformers 14), which in turn supply control power to corresponding M2LC subsystems 12. It will be appreciated that the AC current source supply 70 and the current transformers may be utilized to provide control power to the M2LC subsystems 12 regardless of the respective operating voltages and operating modes of the M2LC subsystems 12. As shown in FIG. 6, the controllable AC current source 70 includes a 20 KHz modulated inverter and a current regulator.

Figure 7:
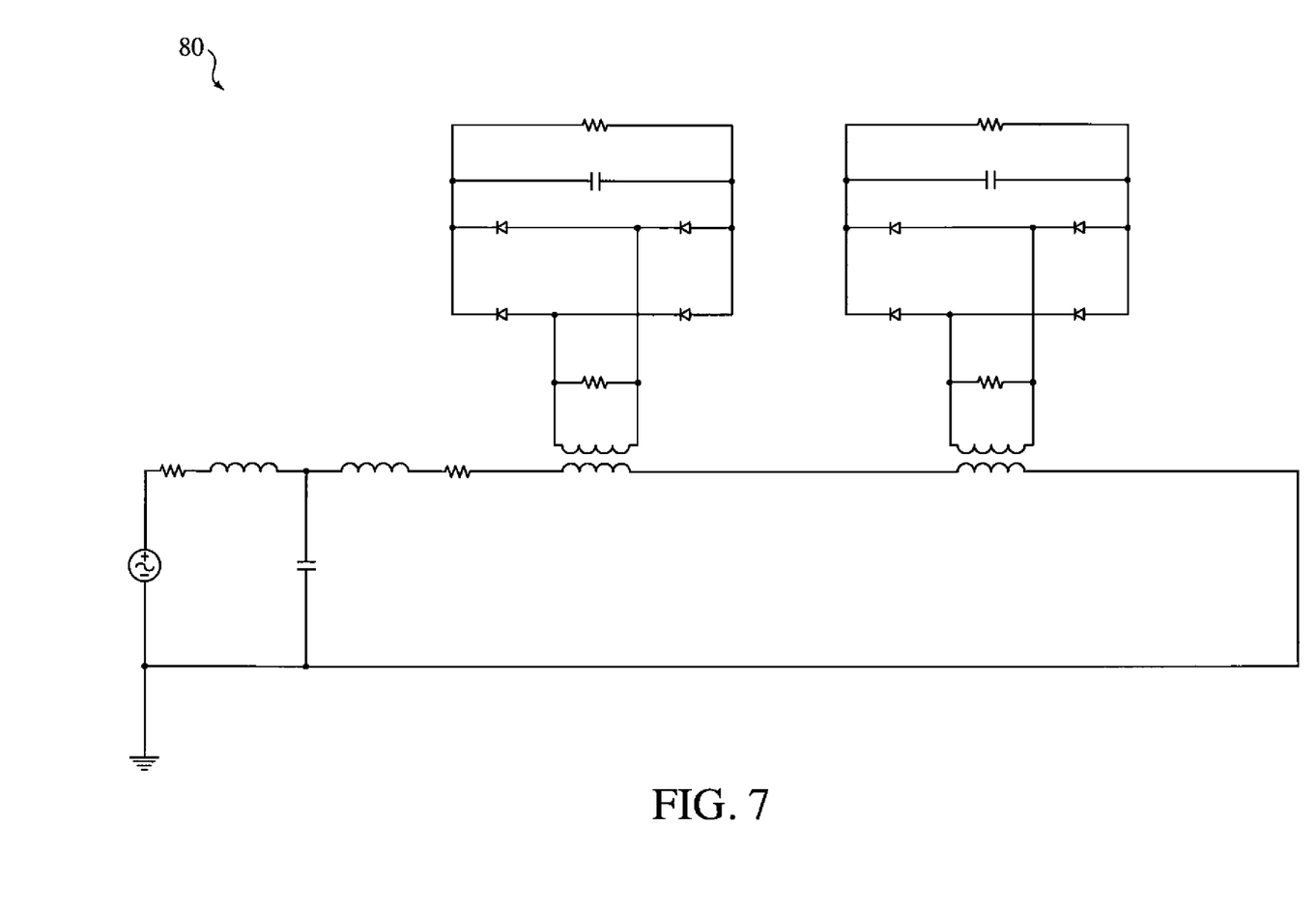
FIG. 7 illustrates a circuit diagram of a current source power supply according to various embodiments.

FIG. 7 illustrates a circuit diagram of a current source power supply 80 according to various embodiments. The current source power supply 80 is a low frequency current source power supply and may be utilized to provide AC current to a plurality of high voltage current transformers (e.g., current transformers 14), which in turn supply control power to corresponding M2LC subsystems 12. In contrast to the controllable AC current source power supply 70 of FIG. 6, the current source power supply 80 may not be able to control the magnitude of the supply current under all abnormal operating conditions. However, because the current source power supply 80 is supplied from low frequency current which is controlled by a suitable size of inductor, the current source power supply 80 may provide a desired window current to the plurality of high voltage current transformers. Although a 60 Hz AC current is shown in FIG. 7, it will be appreciated that the AC current may be provided at a frequency other than 60 Hz (e.g., 50 Hz).

Figure 8:
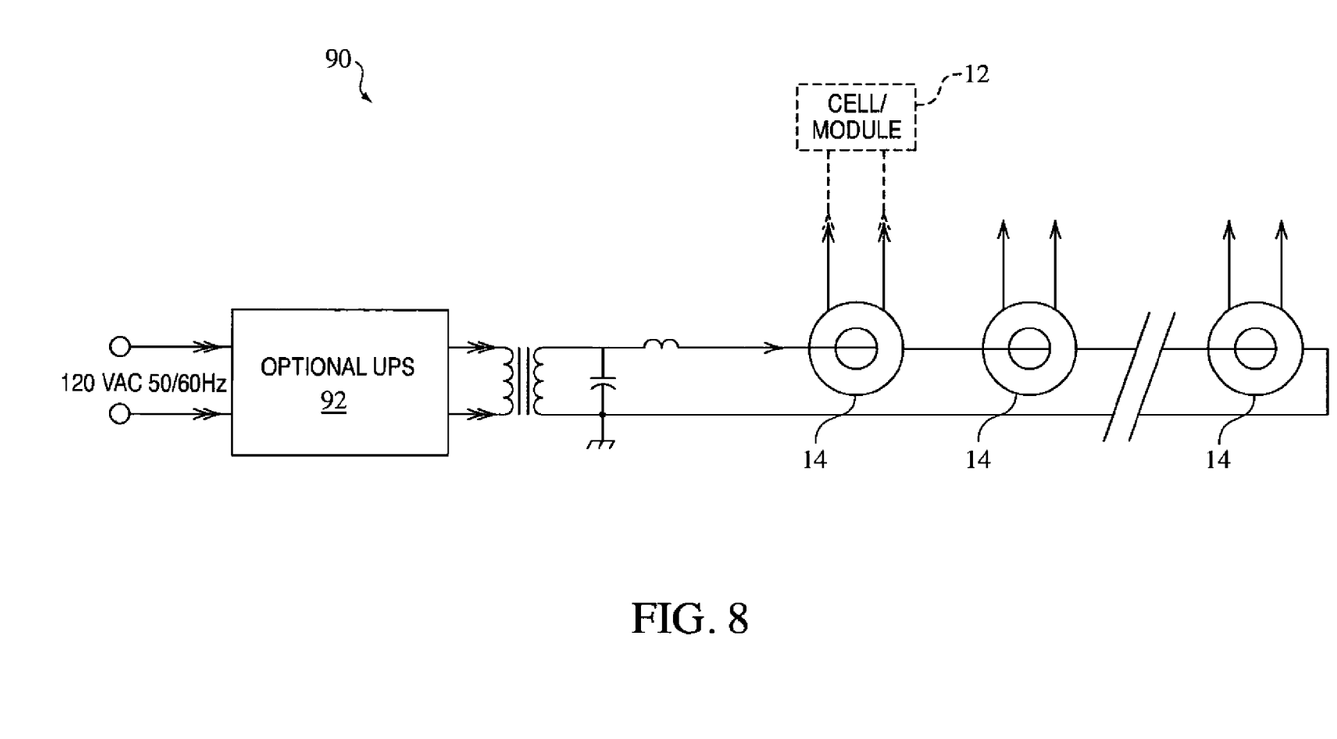
FIG. 8 illustrates a circuit diagram of a current source power supply according to other embodiments.

FIG. 8 illustrates a circuit diagram of a current source power supply 90 according to other embodiments. The current source power supply 90 is a low frequency current source power supply which incorporates an uninterrupted power supply 92, and may be utilized to provide AC current to a plurality of high voltage current transformers (e.g., current transformers 14), which in turn supply control power to corresponding M2LC subsystems 12. It will be appreciated that the uninterrupted power supply 92 may be utilized to supply energy to the current source power supply 90 during a loss of supply voltage (e.g., a power outage). Although a 60 Hz AC current is shown in FIG. 7, it will be appreciated that the AC current may be provided at a frequency other than 60 Hz (e.g., 50 Hz).

Figure 9:
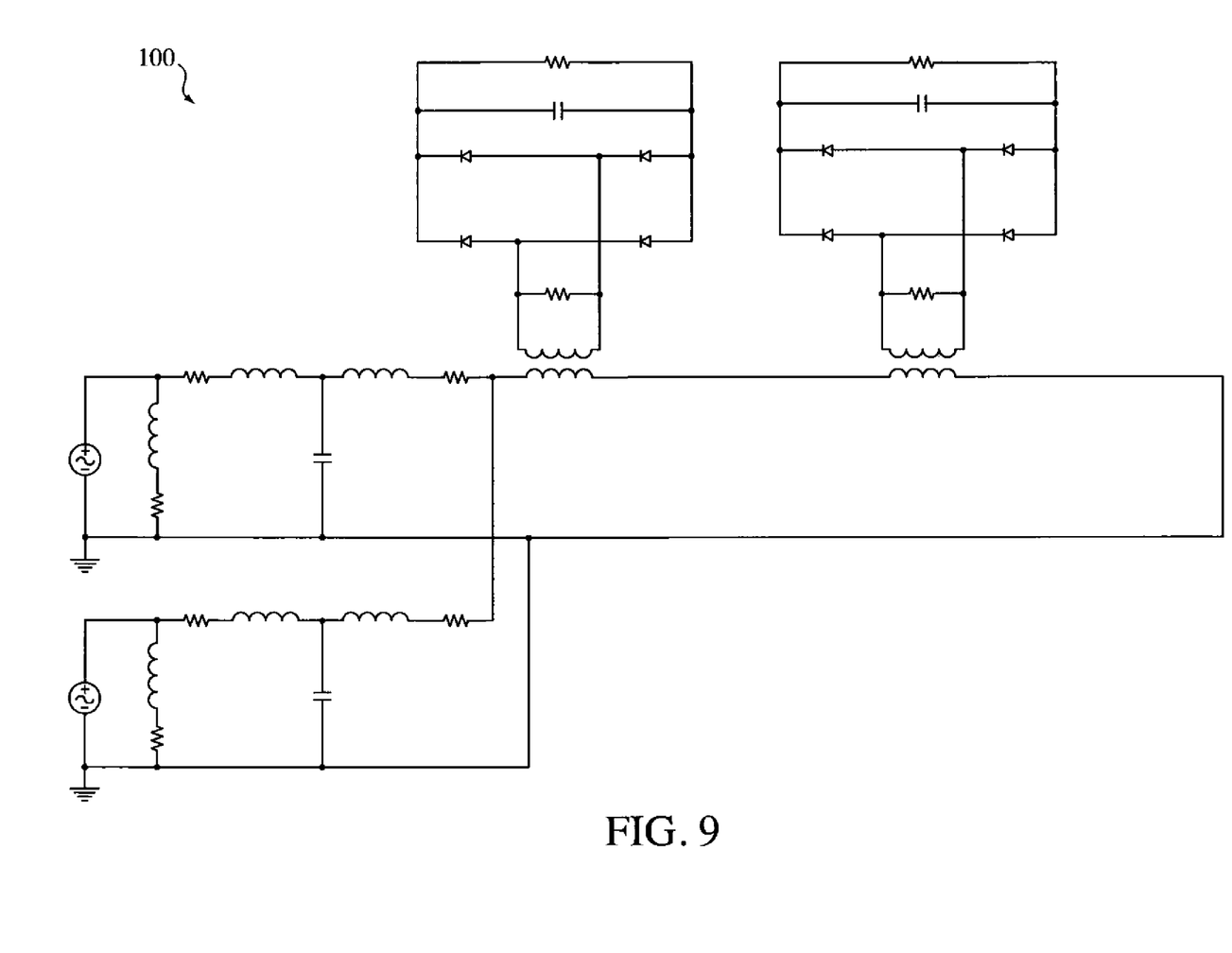
FIG. 9 illustrates a circuit diagram of a current source power supply according to yet other embodiments.

FIG. 9 illustrates a circuit diagram of a current source power supply 100 according to yet other embodiments. The current source power supply 100 is a low frequency power supply, and may be utilized to provide AC current to a plurality of high voltage current transformers (e.g., current transformers 14), which in turn supply control power to corresponding M2LC subsystems 12. The current source power supply 100 is similar to the current source power supply 80 of FIG. 7, but is different in that the current source power supply 100 includes two low frequency AC current sources in parallel. It will be appreciated that the two low frequency current sources operate to eliminate a single point of failure with respect to the external control power supplied to the M2LC subsystems of a M2LC system.

In view of the foregoing, it will be appreciated that the distributed power supplies described hereinabove can supply the required control power (e.g., cell control and gate control power) to the M2LC subsystems under all operating conditions, including fault conditions. The distributed power supplies are fed from a current source so that a failure of any of the distributed power sources on the subsystems which could result in a short circuit of the cell supply voltage in one subsystem will not effect the power supply operation of any other subsystem.

Additionally, it will also be appreciated that utilizing the M2LC topology with current transformers fed from a common control AC power source allows for any of the following functionality to be realized:

(1) M2LC two-terminal subsystem local control (shown in FIG. 1) can be completely characterized and validated prior to any application of voltage to the main DC source feeding the two-terminal subsystems in series (see FIG. 3);

(2) the complete control of gate signals of the two-terminal subsystems during pre-charge of the DC links of the cells so that the proper operating voltage is established as the system precharges;

(3) the cell has no operating voltage limits limited by the cell control power supply. Thus, parts or all of the power switching of the two-terminal subsystem can be placed in a zero voltage state since the subsystem's local DC link is not required to sustain cell control power. This allows for functional bypass of a given two-terminal subsystem when various failures of the given two-terminal subsystem occur, allowing other two-terminal subsystems to continue to operate;

(4) since the power supply to each subsystem is fed from an external current source (not from a subsystem DC link), the subsystem power supply can be designed to operate with M2LC's subsystems designed for various IGBTs (e.g., 1700v, 3300v, 6500v, etc.) with no significant changes; and (5) since the correct current required to operate the control system on each subsystem can be set by the controllable current source, periodic voltage monitoring of the resultant cell power supply voltage can be used to determine and trend the "health" of the subsystem control circuits.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A modular multilevel converter system, comprising:
   a plurality of series connected two-terminal modular multilevel converter subsystems, wherein at least one of the plurality of series connected two-terminal modular multilevel converter subsystems comprises:
      a plurality of switching devices; and
      a plurality of capacitors, wherein at least one of the plurality of capacitors is connected to at least one of the plurality of switching devices, wherein the at least one of the plurality of series-connected two-terminal modular multilevel converter subsystems is magnetically coupled to an AC current source power supply.

2. The system of claim 1, wherein the at least one of the plurality of series connected two-terminal modular multilevel converter subsystems is connected to a current transformer which is connected to the AC current source power supply.

3. The system of claim 2, wherein the at least one of the plurality of series connected two-terminal modular multilevel converter subsystems receives control power from the current transformer independent of an energy state of the at least one of the plurality of series-connected two-terminal modular multilevel converter subsystem.

4. The system of claim 2, wherein the at least one of the plurality of series connected two-terminal modular multilevel converter subsystems receives control power from the current transformer.

5. The system of claim 1, wherein the plurality of series connected two-terminal modular multilevel converter subsystems are connected to corresponding current transformers which are connected to the AC current source power supply.

6. The system of claim 5, wherein the plurality of series connected two-terminal modular multilevel converter subsystems receive control power from the corresponding current transformers independent of respective energy states of the plurality of series-connected two-terminal modular multilevel converter subsystems.

7. The system of claim 5, wherein the plurality of series connected two-terminal modular multilevel converter subsystems receive control power from the corresponding current transformers.

8. The system of claim 1, wherein the at least one of the plurality of series connected two-terminal modular multilevel converter subsystems is connected to a distributed power source.

9. The system of claim 1, wherein each of the plurality of series connected two-terminal modular multilevel converter subsystems are connected to corresponding distributed power sources.

10. The system of claim 1, wherein the at least one of the plurality of series-connected two-terminal modular multilevel converter subsystems further comprises:
    a plurality of diodes, wherein at least one of the plurality of diodes is connected to the at least one of the plurality of switching devices.

11. The system of claim 1, wherein the at least one of the plurality of series connected two-terminal modular multilevel converter subsystems further comprises a controller connected to the plurality of switching devices.

12. The system of claim 11, wherein the controller is further connected to a current transformer which is connected to the AC current source power supply.

13. The system of claim 1, wherein the AC current source power supply is a controllable AC current source power supply.

14. The system of claim 1, wherein the AC current source power supply is a high frequency AC current source power supply.

15. The system of claim 1, wherein the current source power supply is a low frequency AC current source power supply.

16. The system of claim 1, wherein the AC current source power supply comprises:
    a first AC current source power supply; and
    a second AC current source power supply.

* * * * *